United States Patent [19]

Bertone

[11] 4,165,122

[45] Aug. 21, 1979

[54] MOTOR VEHICLE BODY WITH A RIGID SUNSHINE ROOF

[75] Inventor: Giuseppe Bertone, Turin, Italy

[73] Assignee: Carrozzeria Bertone S.p.A., Grugliasco, Italy

[21] Appl. No.: 844,169

[22] Filed: Oct. 21, 1977

[30] Foreign Application Priority Data

Nov. 2, 1976 [IT] Italy .................................. 69625/76

[51] Int. Cl.$^2$ ............................................. B60J 7/24
[52] U.S. Cl. .................................. 296/107; 296/137 B
[58] Field of Search ................ 296/137 B, 137 F, 107; 49/272, 203

[56] References Cited

U.S. PATENT DOCUMENTS 1,988,346  1/1935  Wagner .............................. 296/107

2,768,024  10/1956  Spear, Jr. .............................. 296/107

FOREIGN PATENT DOCUMENTS 1580067  10/1970  Fed. Rep. of Germany ....... 296/137 B
1555187  12/1970  Fed. Rep. of Germany ....... 296/137 B Primary Examiner—Robert R. Song
Attorney, Agent, or Firm—Sughrue, Rothwell, Mion, Zinn and Macpeak

[57] ABSTRACT

A motor vehicle sunshine roof comprises a rigid roof panel which is connected by pivoted lever arms to opposite sides of the vehicle body so as to move into a stowed vertical position behind the seats when the roof is open, the roof panel being positively guided in its movement by fixed guides in the sides of the vehicle body.

4 Claims, 3 Drawing Figures

MOTOR VEHICLE BODY WITH A RIGID SUNSHINE ROOF

The present invention relates to motor vehicle bodies incorporating rigid sunshine roofs.

Vehicle bodies are known in which a rigid sunshine roof panel is secured to a fixed roof structure by means of two hooks engaging a transverse "roll bar" and by means of two releasable internal connectors to the upper edge of the vehicle windscreen.

A disadvantage of such bodies is that to open the sunshine roof it is necessary to disengage the roof panel from the fixed roof structure and place the panel in a front or rear boot or trunk of the vehicle.

Vehicle bodies with rigid sunshine roofs are also known in which a roof panel is supported by lever arms hinged to the vehicle body and in which, in the open position of the roof, the panel is carried on the outside of the vehicle body, for example on a rear boot or trunk lid. Such an arrangement has the disadvantage that in the open position of the roof the appearance of the vehicle body is spoilt.

An object of the present invention is to provide a vehicle body with rigid sunshine roof, avoiding the disadvantages referred to above.

According to the present invention there is provided a motor vehicle body having a sunshine roof comprising a rigid movable roof panel pivotally connected by guide means to the vehicle body, characterised in that the said guide means are such that in the open position of the roof the roof panel is located in a substantially vertical position behind the back rests of seats of the vehicle.

The present invention affords a sunshine roof in which the rigid roof panel is secured to the vehicle body and has a convenient stowed position when the roof is open.

Preferably the guide means comprise two lever arms pivotally connected to opposite sides of the roof panel and hinged to opposite sides of the vehicle body for pivotal movement about a transverse axis located behind the back rests and at least one curved lateral guide rail fixed to the body and arranged for engagement by a respective guide engaging element fixed to the roof panel as the panel moves between its open and closed positions, so as to guide the panel positively during such movement. The rigid sunshine roof panel is thereby positively guided in its opening and closing movements.

In order to allow rear vision when the roof panel is in the open position the latter preferably has a window at least in a front portion.

The invention will be further described, by way of example, with reference to the accompanying drawings, in which.

Figure 1:
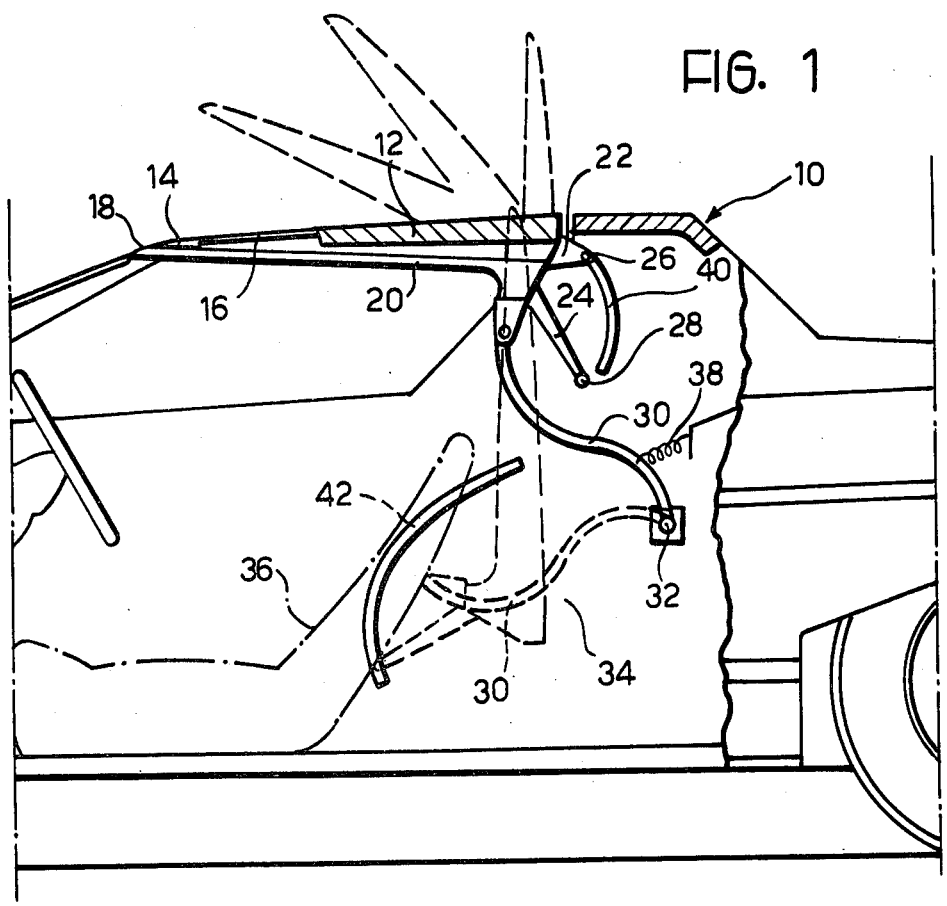
FIG. 1 is a side elevation, partly cut away, of an automobile having a sunshine roof according to one embodiment of the invention.

The drawings illustrate the body 10 of a sports car fitted with a sunshine roof having a rigid movable roof panel 12. The roof panel 12 has a front part 14 which when the roof panel 12 is closed, bears against the upper edge of the frame structure 18 of the windscreen, to which the front part 14 is attached by means of internal latches, as known per se. Part of the front part 14 is provided with a window 16.

The roof 12 has two rearwardly located depending side flanges 20 each of which has upper and lower rearwardly projecting appendages 22 and 24. The free ends of the appendages 22 and 24 carry upper and lower laterally projecting pins 26 and 28 respectively which act as guide engaging elements.

A lever arm 30 is articulated to the bottom of each side flange 20. The lower end of each lever arm 30 is hinged to a side wall of the body 10 for rotation about a pivot axis 32 which is located in a compartment 34 behind the back rests 36 of the car seats. Near the pivot axis 32, in the compartment 34, one end of a tension spring 38 acts on the arm 30, the other end of the spring behind anchored to the body 10.

Figure 2:
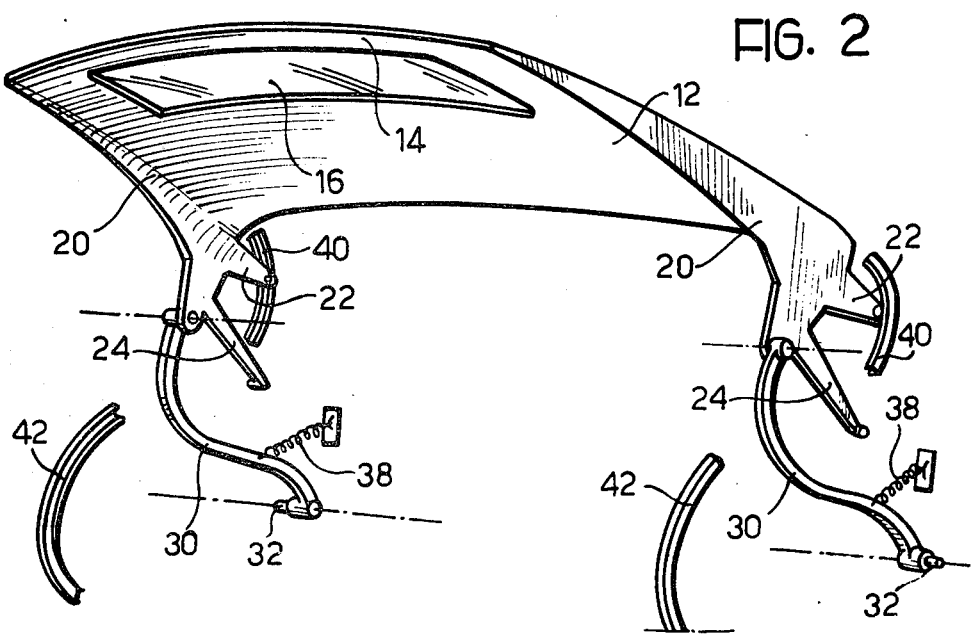
FIG. 2 is a diagrammatic perspective view of the roof and the guide means for the rear part of the roof.
Figure 3:
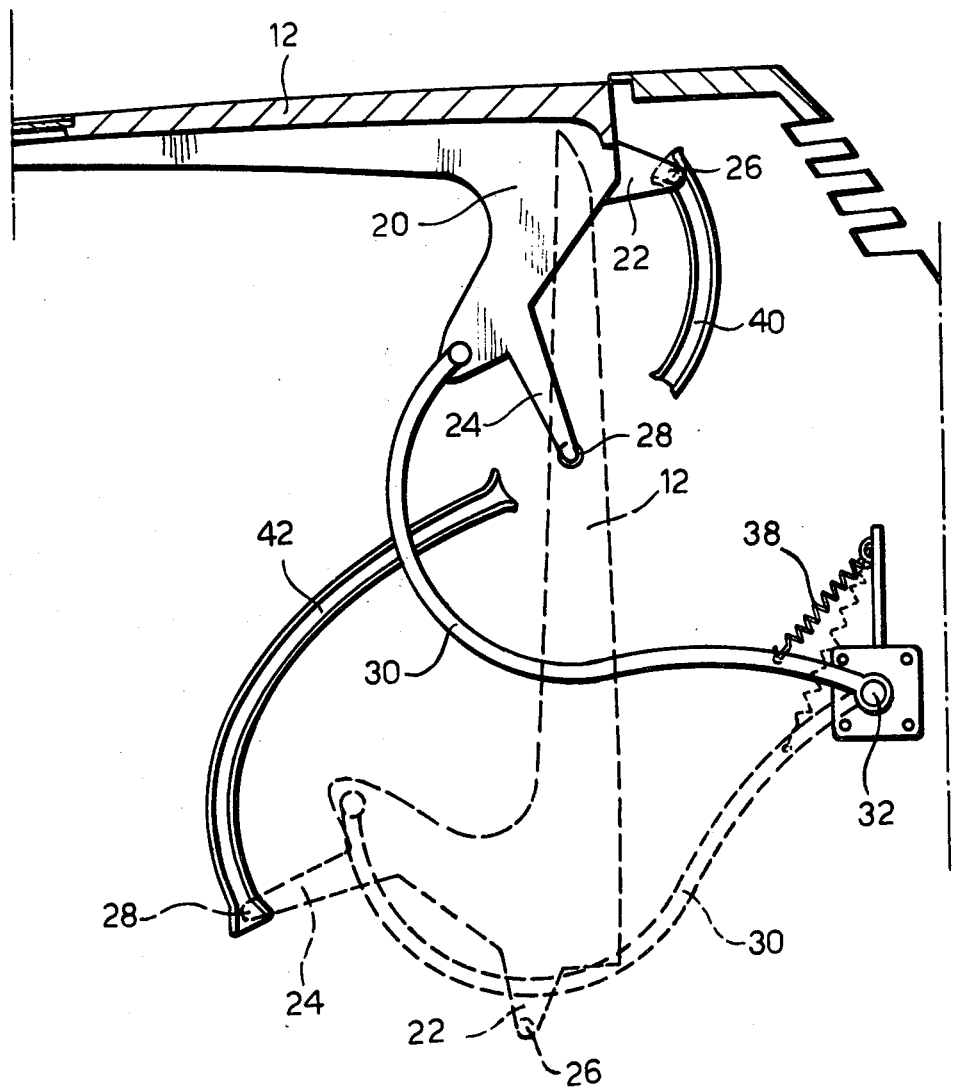
FIG. 3 is a diagrammatic side view, on an enlarged scale, of part of the roof and of its guide means.

To each side of the body 10 there are affixed upper and lower curved guide rails 40 and 42 respectively, spaced apart from each other, as shown in FIGS. 2 and 3. The rails 40 and 42 are C-shaped and are positioned so as to be engaged by the aforesaid pins 26 and 28.

To open the sunshine roof the roof panel 12 is unlatched from the upper edge of the windscreen frame structure 18 and lifted rearwardly, as shown in ghost outline in FIG. 1. In the first part of this movement, the upper pin 26 is engaged in and travels downwardly along the upper guide rail 40. Before the pin 26 has reached the end of its travel along the upper guide rail 40, the lower pin 28 engages in the lower guide rail 42, and travels initially along a part of the lower rail 42 which is convexly curved towards the front part of the vehicle. The effect of this curvature of the lower guide rail 42 is to cause a certain friction between the lower pin 28 and the rail 42, which prevents the roof panel 12 from dropping too quickly. At the end of this movement the roof panel 12 will be in a vertical position in the compartment 34 behind the seat back rests 36. The window 16 in the roof panel affords unobstructed rear vision in this position of the roof panel.

Upon closing of the roof the movement of the roof panel takes place in the opposite direction.

During the movement of the roof panel 12, the spring 38 serves to balance the weight of the roof panel 12.

It will be understood that details of construction and practical embodiments of the invention may be widely varied in relation to what has been described and illustrated by way of example, without nevertheless departing from the scope of the present invention.

What is claimed is:

1. In a motor vehicle having a body, seats with back rests, a space behind said back rests and a sunshine roof including a separate rigid roof panel movable between a first closed position in which said panel is disposed in a substantially horizontal plane and a second open position in which said panel is disposed in the space behind said back rests, the improvement comprising supporting means pivotally connected both to the vehicle body and to the roof panel and guide means on said vehicle body and said roof panel for positively guiding the movement of said panel between its first and second positions for compelling said panel to be disposed in a substantially vertical position when said panel is disposed in its second open position; said supporting means is comprised of two lever arms disposed at opposite sides of said roof panel, each of said arms having one end pivotally connected to said panel and the opposite end thereof pivoted to said vehicle body for pivotal movement about a horizontal transverse axis located behind said back rests and said guide means is comprised of at least one curved guide rail fixed to the vehicle body at one side of the roof panel and a complimentary guide engaging element on said panel adapted to operatively engage said guide rail.

2. In a motor vehicle as set forth in claim 1, wherein said guide means are comprised of two guide rails fixed to the vehicle body and disposed at opposite sides of said roof panel, said roof panel being provided with two guide engaging elements adapted to engage said two guide rails respectively.

3. In a motor vehicle as set forth in claim 2, wherein each of said guide rails is discontinuous and a separate guide engaging element is provided for engagement with each portion of the discontinuous guide rail, said separate guide elements being spaced so that one of the guide elements enters its respective portion of the discontinuous guide rail just before the other guide element leaves its portion of the discontinuous guide rail.

4. In a motor vehicle having a body, seats with back rests, a space behind said back rests and a sunshine roof including a separate rigid roof panel movable between a first closed position in which said panel is disposed in a substantially horizontal plane and a second open position in which said panel is disposed in the space behind said back rests, the improvement comprising supporting means pivotally connected both to the vehicle body and to the roof panel and guide means on said vehicle body and said roof panel for positively guiding the movement of said panel between its first and second positions for compelling said panel to be disposed in a substantially vertical position when said panel is disposed in its second open position; said roof panel extends above said back rests when vertically disposed in said open position and is provided with a portion of transparent material in said portion extending above said back rests to assure rear vision.

* * * * *